R. W. ROSEBROUGH.
TRUCK.
APPLICATION FILED JUNE 3, 1911.
1,006,287.
Patented Oct. 17, 1911.
2 SHEETS—SHEET 2.
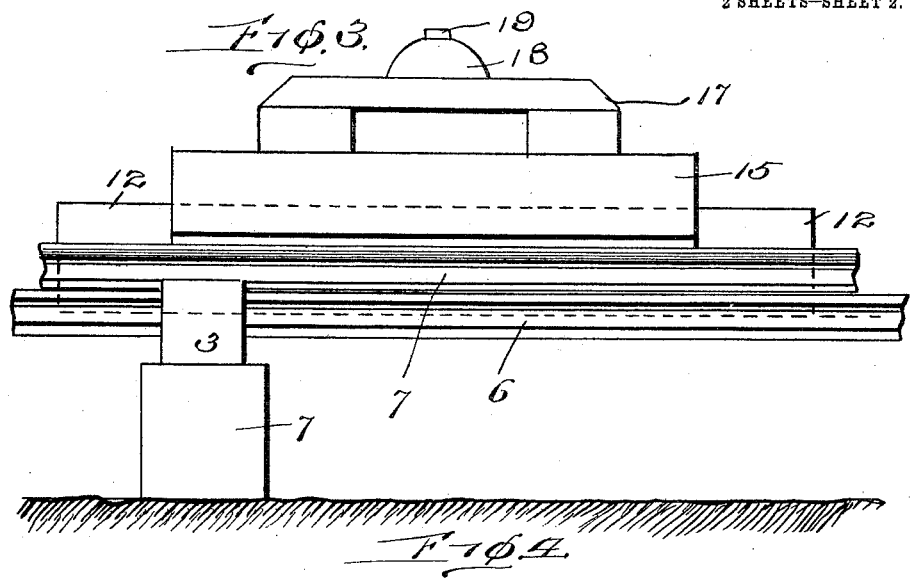
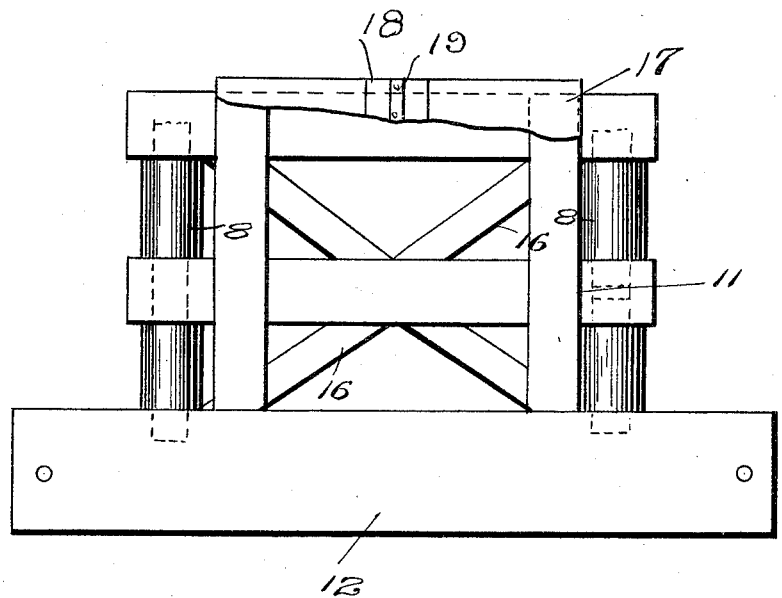
Witnesses
J. M. Fowler Jr.
A. S. Kitchin
Inventor
Robert W. Rosebrough
By Mason Fenwick & Lawrence
his Attorneys

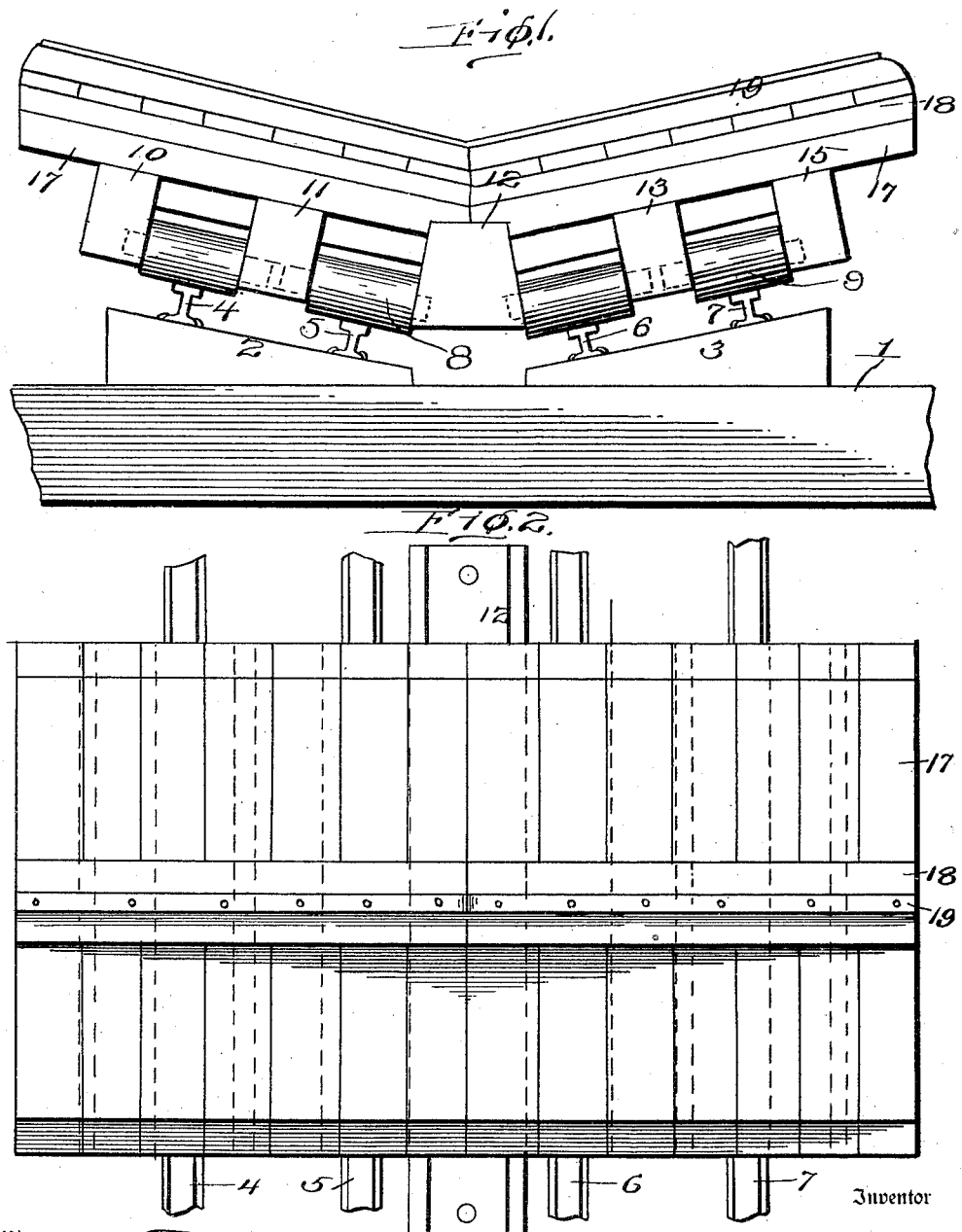

UNITED STATES PATENT OFFICE.

ROBERT W. ROSEBROUGH, OF PORTLAND, OREGON.

TRUCK.

1,006,287. Specification of Letters Patent. Patented Oct. 17, 1911.

Application filed June 3, 1911. Serial No. 631,178.

*To all whom it may concern:*

Be it known that I, ROBERT W. ROSE-BROUGH, a citizen of the United States, residing at Portland, in the county of Multnomah and State of Oregon, have invented certain new and useful Improvements in Trucks; and I do hereby declare the following to be a full, clear, and exact description of the invention, such as will enable others skilled in the art to which it appertains to make and use the same.

This invention relates to improvements in trucks, and particularly to logging trucks, and has for an object the arrangement of improved means which will accommodate one or more logs of any size and transport the same from one place to another.

Another object of the invention is the arrangement of an angle truck formed so that the same will automatically hold itself in proper position upon an angle roadway, the construction being such that the weight of the logs or other material will automatically move toward the center of the truck unless already in that position.

A still further object of the invention is the arrangement of an angle truck and a roadway co-acting therewith, the roadway being provided with a plurality of rails while the truck is provided with a plurality of rollers which act as supporting wheels, and a body formed with preferably a single rider having a cap for permitting the passing of the truck around curves without shifting to any considerable extent the load carried by the truck even when a plurality of trucks are connected.

With these and other objects in view the invention comprises certain novel constructions, combinations, and arrangement of parts as will be hereinafter more fully described and claimed.

In the accompanying drawings: Figure 1 is a front view of a truck and a sectional view through a roadway. Fig. 2 is a top plan view of the structure shown in Fig. 1. Fig. 3 is a side view of the structure shown in Fig. 1. Fig. 4 is a top plan view of part of the truck shown in Fig. 1, certain parts being broken away.

In constructing a device embodying the invention an angle roadway is provided for accommodating an angular truck formed of a plurality of longitudinal beams in which are located supporting rollers. Preferably there are arranged two rollers on each side of the truck set at an angle to the horizontal with the abutting ends nearer the earth than the opposite ends. The truck is formed with a floor and a rider set at substantially the same angle as the rollers so that a log or a plurality of logs when placed on the truck will automatically move toward the center and will consequently not easily slide off the truck nor cause the truck to move from its correct position on its supporting rail.

In order that the invention may be more clearly understood an embodiment of the same is shown in the accompanying drawings in which 1 indicates any desired number of ties on which are arranged angular blocks 2 and 3. Blocks 2 and 3 support any desired number of rails 4, 5, 6 and 7. Resting on these rails are rollers 8—8 and 9—9, the rollers, of course, being set at the same angle at which blocks 2 and 3 are made. The rollers 8—8 and 9—9 are pivotally mounted in longitudinal beams 10, 11, 12, 13 and 14, beam 12 being preferably larger than the other beams, and arranged centrally of the truck so that the lower ends of the rollers may be journaled therein. These beams are braced by suitable bracing members 16, and are also held in proper place by the flooring 17. Arranged on top of the flooring 17 and, of course, above the respective beams is a rider 18 which conforms to the shape of the floor but extends from one side of the truck to the other. Arranged on the upper edge of the rider 18 is preferably a metallic cap 19. Cap 19 may be formed of any desired kind of rail or bar which can be rigidly secured in place. By this construction and arrangement the contact of the log or logs on the truck will be limited to the cap, but the strain will be distributed therefrom to the entire truck so that each of the rollers will have a substantially equal strain exerted thereon.

In use two or more of the trucks are preferably used, though, of course, one could be used by itself when the log or other article placed thereon is balanced by the person using the truck. By the arrangement of the rider and cap in addition to properly taking and distributing the strain, means are provided which will permit the truck to pass around curves without causing the truck to bind or twist against the track.

What I claim is:

1. An angle road truck comprising a plurality of longitudinal beams, a plurality of rollers revolubly mounted in said beams and arranged at an angle to the horizontal with the abutting ends of the rollers nearer the earth than the outer ends of the rollers, a floor structure arranged on said beams and conforming thereto for providing a centrally converging support and a rider extending entirely across said floor and positioned transversely of the beams.

2. In an angle roadway truck, traction rollers, a plurality of beams for said rollers, a rider extending transversely of said beams and arranged so that the opposite halves are at an angle meeting centrally of the beams, and a cap structure arranged on the top of said rider.

3. In an angle roadway truck, a framework comprising a pair of longitudinal beams, and a central beam, a pair of rollers revolubly mounted in each pair of longitudinal beams and arranged so that the inner ends will be journaled in said central beam, the inner ends of said rollers being nearer the earth than the outer ends, a floor connected with said beams and arranged so that the central part will be lower than the outer edge, a rider conforming to the shape of said floor and extending entirely across said floor and transversely of said beams, and a cap mounted on the apex of said rider for minimizing the contact surface of the load on said truck.

4. In an angle road truck, a body portion formed of a plurality of side beams extending longitudinally of the truck, a plurality of cross braces for holding the beam in place, and a central longitudinal beam, said central longitudinal beam being formed with a plurality of bores and each of said side beams being formed with a plurality of bearing openings, a pair of rollers for each side of said truck positioned in said bearing openings and having one end extend into said bores, a rider extending transversely of said beams and arranged so that the central part will be lower than the outer ends, and a metallic cap secured to said rider along the apex thereto for minimizing the contact surface of the load in order to permit the truck to move around curves without materially shifting the load.

In testimony whereof I affix my signature in presence of two witnesses.

ROBERT W. ROSEBROUGH.

Witnesses:
C. H. CHAMBREAU,
C. A. KRESSMANN.

Copies of this patent may be obtained for five cents each, by addressing the "Commissioner of Patents, Washington, D. C."